US012768193B2

(12) United States Patent
Lowrey

(10) Patent No.: US 12,768,193 B2
(45) Date of Patent: Oct. 20, 2026

(54) FENCING ATTACHMENT FOR A HAND HELD POWER TOOL

(71) Applicant: WIREMAN PTY LIMITED, New South Wales (AU)

(72) Inventor: Ian Lowrey, New South Wales (AU)

(73) Assignee: WIREMAN PTY LIMITED, New South Wales (AU)

( * ) Notice: Subject to any disclaimer, the term of this patent is extended or adjusted under 35 U.S.C. 154(b) by 280 days.

(21) Appl. No.: 18/683,919

(22) PCT Filed: Aug. 8, 2022

(86) PCT No.: PCT/AU2022/050856

§ 371 (c)(1),
(2) Date: Feb. 15, 2024

(87) PCT Pub. No.: WO2023/035025

PCT Pub. Date: Mar. 16, 2023

(65) Prior Publication Data

US 2025/0223833 A1 Jul. 10, 2025

(30) Foreign Application Priority Data

Sep. 9, 2021 (AU) ................................ 2021902924

(51) Int. Cl.
*B25F 3/00* (2006.01)
*E04H 17/26* (2006.01)

(52) U.S. Cl.
CPC ............. *E04H 17/266* (2013.01); *B25F 3/00* (2013.01)

(58) Field of Classification Search
CPC ....... E04H 17/05; E04H 17/10; E04H 17/268; E04H 17/266; B21F 15/02; B21F 15/04; B25F 3/00; B25F 5/001
See application file for complete search history.

(56) References Cited

U.S. PATENT DOCUMENTS 7,290,570 B1 * 11/2007 Spikes .................... B21F 15/04
140/93.6
2020/0102105 A1 4/2020 Seesing

FOREIGN PATENT DOCUMENTS

CA 2253031 A1 5/2000
CH 643163 A5 5/1984

OTHER PUBLICATIONS

International Search Report and Written Opinion issued on Sep. 21, 2022 for corresponding PCT Application No. PCT/AU2022/050856.

(Continued)

*Primary Examiner* — Teresa M Ekiert
(74) *Attorney, Agent, or Firm* — POLSINELLI PC

(57) ABSTRACT

A fencing attachment (30) for a power tool (32) is disclosed. The attachment housing (31) has a mouth (40), and an engagement means to permit the attachment to be powered by the power tool. A gear train drives a rotor (44). The rotor has a longitudinally extending radial slot which reaches its axis of rotation. The rotor is mounted facing a mouth (40). There is at least one winding arm (51) mounted exterior of the housing, being rotatable with the rotor, and carrying a sheave (52) rotatably mounted on the winding arm at a location radially spaced from the axis of rotation. The mouth can envelop a first stationary wire (1) and locate same within the rotor substantially co-incident with the axis of rotation. A second wire (2) can be engaged with the sheave, and rotation of the rotor winds the second wire around the first wire.

12 Claims, 12 Drawing Sheets

(56) References Cited

OTHER PUBLICATIONS

International Preliminary Report on Patentability issued on Dec. 21, 2023 for corresponding PCT Application No. PCT/AU2022/050856.

* cited by examiner

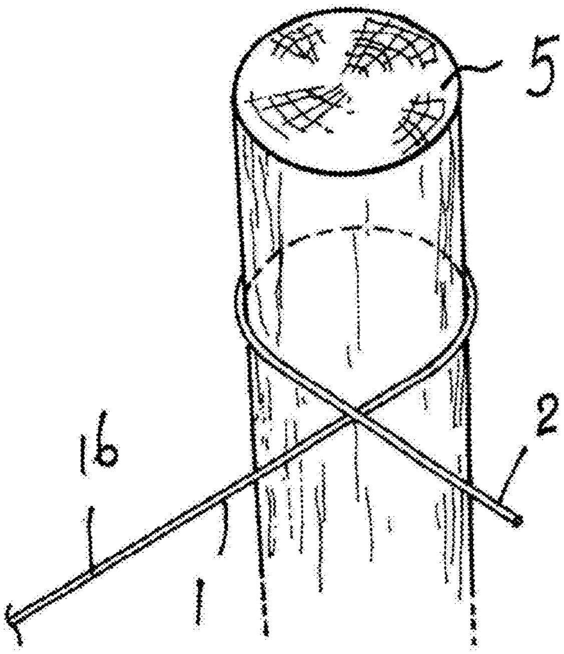
FIG. 5A
FIG. 5B
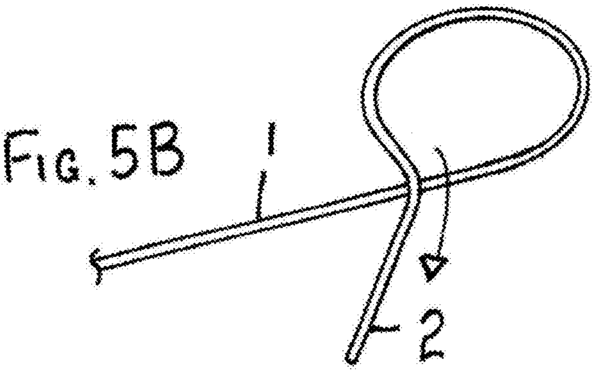
FIG. 5C
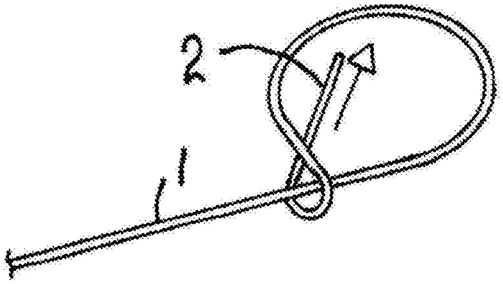
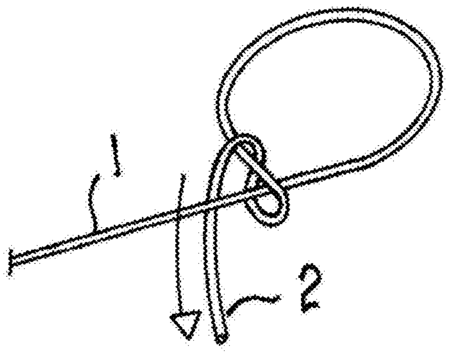
FIG. 5D
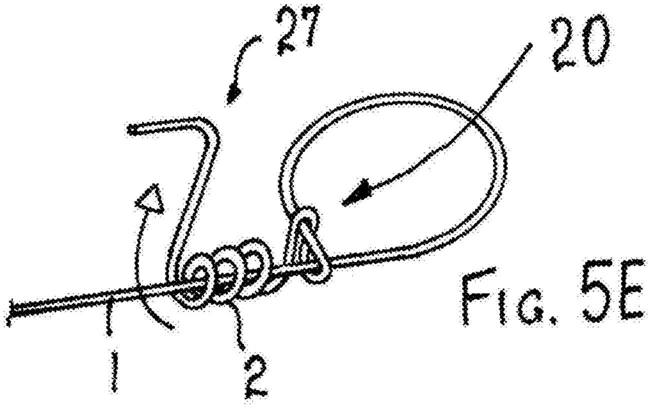
FIG. 5E
PRIOR ART

FENCING ATTACHMENT FOR A HAND HELD POWER TOOL

CROSS-REFERENCE TO RELATED APPLICATIONS

This application is a national stage application (under 35 U.S.C. § 371) of PCT/AU2022/050856, filed Aug. 8, 2022, which claims benefit of Australian Application No. 2021902924, filed Sep. 9, 2021, which are incorporated herein by reference in their entireties.

FIELD OF THE INVENTION

The present invention relates to agricultural fencing and, in particular, to a fencing attachment for a hand-held power tool, the attachment permitting some actions in knot tying to be mechanised.

BACKGROUND ART

The construction and maintenance of agricultural fencing are labour intensive tasks. The cost of a fence is dependent upon both the cost of the materials purchased to construct or repair the fence, and the cost of the labour involved in construction or repair of the fence. For most farms, the capital invested into fencing constitutes a major investment. Since fencing contractors, in particular, often charge the farmer by the distance of the fence times a fixed cost per kilometre, there is a large incentive for the fencing contractor to speed up the fence erection process. For the farmer who does his own fencing, there is also clearly a desire to enable fences to be both erected and repaired as quickly as possible.

Whilst historically many fences consisted only of multiple strands of barbed and/or plain wire, in recent times this type of fence has been superseded by mesh fences, particularly in respect of exclusion fences which are intended to keep non-domestic animals out and the farmer's stock in. The mesh used in agricultural fences typically consists of from 7 to 17 horizontal strands and a plurality of vertical pickets which are secured to the horizontal strands and which define a generally rectangular opening which is typically 150 mm in width and 50-125 mm in height. For example, a mesh sold as 11/90/15 has eleven horizontal wires, a vertical extent of the roll of 90 cm, and a horizontal spacing of 15 cm between the vertical or picket wires. The spacing between the horizontal wires is smallest at the bottom of the fence and increases upwardly. In general, the wider the range of animals to be excluded, the smaller the size of the rectangular opening.

The mesh for such exclusion fencing is manufactured in rolls and it is necessary for the horizontal strands at one end of each roll to be secured to the vertical strainer post at the corresponding end of the run of mesh. At present this securing is achieved by knotting the wire of each horizontal strand around the strainer post, or applying a fastening device in lieu of a knot. Both methods are labourious with the knotting method being slower than the use of the fastening devices. However, use of the fastening devices incurs an appreciable capital cost because of the large number of devices required to be used.

GENESIS OF THE INVENTION

The Genesis of the present invention is a desire to reduce, or at least ameliorate, the above-mentioned disadvantages.

SUMMARY OF THE INVENTION

In accordance with a first aspect of the present invention there is disclosed a fencing attachment for a hand held power tool having a power outlet, said attachment comprising:

a housing having a mouth, an engagement means associated with said housing to permit both the housing to be engaged with the power tool and a drive input of the attachment to be rotatably coupled to the power outlet, a gear train extending from said drive input to a rotor having an axis of rotation, said rotor having a longitudinally extending radial slot which reaches said rotor axis of rotation, and said rotor being rotatably mounted facing said mouth, at least one winding arm mounted exterior of said housing, being rotatable with said rotor, and carrying a sheave rotatably mounted on said winding arm at a location radially spaced from said axis of rotation, wherein said mouth can envelop a first stationary wire and locate same within said rotor substantially co-incident with said axis of rotation, a second wire can be engaged with said sheave, and rotation of said rotor by said power tool winds said second wire around said first wire.

Preferably, the attachment has a pair of the winding arms located on opposite sides of the mouth and each being rotatable with the rotor.

Preferably, the attachment has at least one arcuate keeper movable between an open position in which the first wire can enter the mouth and slot, and a closed position in which the first wire is prevented from leaving the mouth and slot.

Preferably, the arcuate keeper(s) is/are movable by a release actuator located within the housing and having a release trigger which extends beyond the housing.

Preferably, each winding arm has a pair of opposed pivoted fingers constituting a latching support rest for the first wire and located closely adjacent the sheave.

Preferably, the fingers are resiliently mounted, are biased towards a closed configuration in which the tips of the fingers contact each other to form a latch, and are movable by the release actuator to release the latch and permit the first wire to move out of said mouth.

According to another aspect of the present invention there is provided a method of winding a second wire around a first wire to form part of a fencing knot, said method comprising the steps of:

passing said first wire into the mouth of the attachment as defined above and locating said first wire in said longitudinally extending radial slot, positioning said second wire on said sheave and crossing said first wire, and operating said power tool to rotate said rotor and winding arm to thereby roll said sheave and second wire around said first wire.

Preferably, the first and second wires are part of the same wire.

BRIEF DESCRIPTION OF THE DRAWINGS

A preferred embodiment of the invention will now be described, by way of example only, with reference to the accompanying drawings in which.

DETAILED DESCRIPTION

Figure 1:
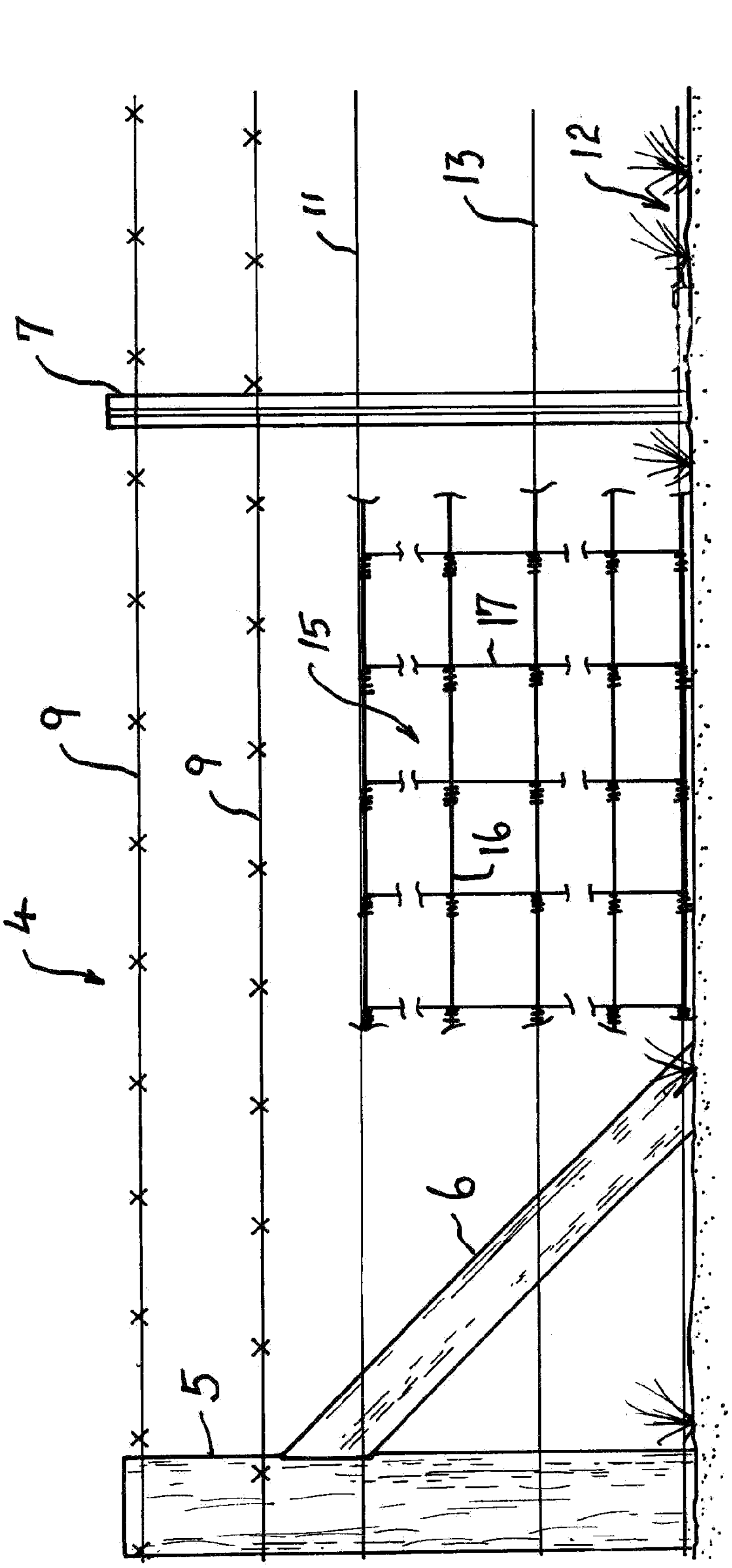
FIG.1 PRIOR ART
FIG. 1 is a side elevation of one end of a prior art mesh fence.

As seen in FIG. 1, a fence 4 commences from a strainer post 5 having a stay 6, and extends alongside a number of intermediate posts which are generally star pickets 7. Depending upon the construction of the fence there may be one or more barbed wires 9 located above a top plain wire 11, a bottom plain wire 12 and a belly plain wire 13. The netting 15 is secured to the strainer post 5 by means of knots and also to at least the top and bottom plain wires 11, 12 by means of netting clips (not illustrated but conventional). It will be seen that the netting takes the form of a number of horizontal strands 16 and a number of vertical pickets 17.

Figure 2:
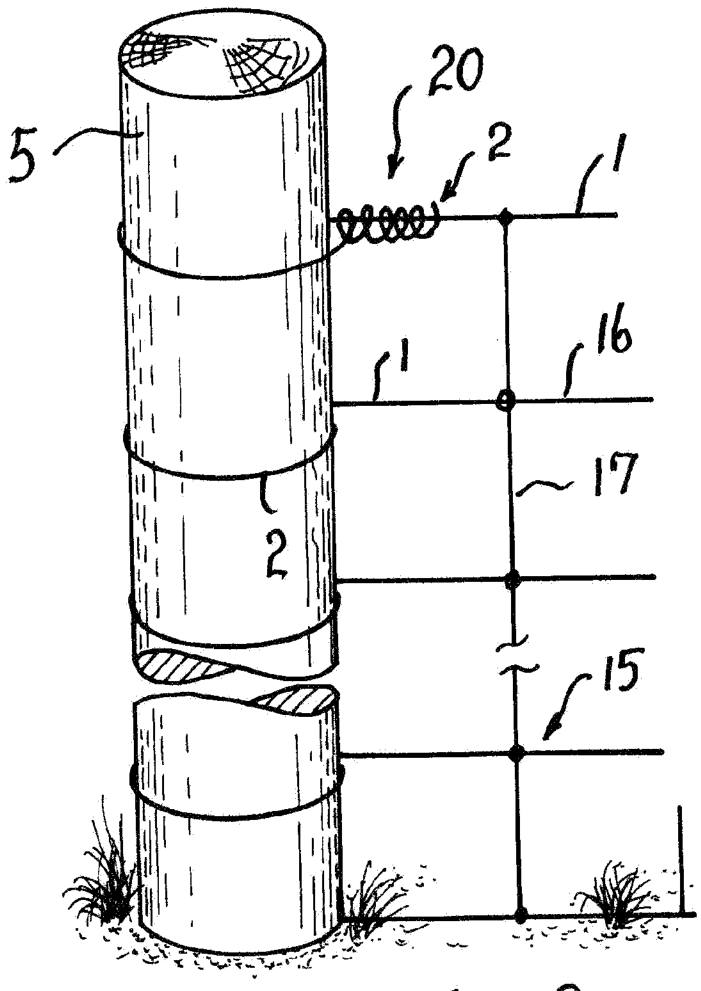
FIG. 2 PRIOR ART
FIG. 2 is a perspective view of the prior art mesh being secured to a strainer post, the stay being omitted so as to not overburdened the drawing.
Figure 3:
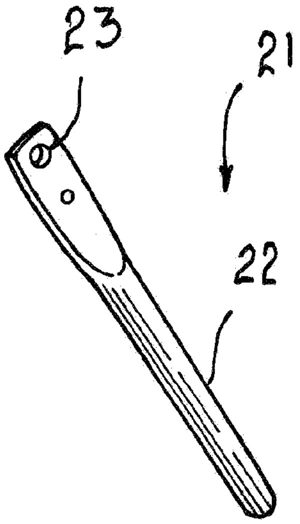
FIG. 3 PRIOR ART
FIG. 3 is a perspective view of a prior art manual fencing tool.

FIG. 2 illustrates schematically how this securing has hitherto been done by the creation of a knot 20 corresponding to each horizontal strand 16 (only one knot 20 being illustrated). The knot 20 is formed by tying the free end of the horizontal strand 16 back onto the same horizontal strand. In the discussion which follows, the knot 20 will be said to be formed by a first wire 1 which is constituted by the horizontal strand adjacent the strainer post 5 and a second wire 2 which is constituted by the free end of the same horizontal strand.

A manual fencing tool 21 having a shank 22 and a plurality of apertures 23 is sometimes used to wind the second wire 2 around the first wire 1. However, whilst this works reasonably well in respect of freestanding wires such as the top plain wire 11 of FIG. 1, it does not work well in the confined rectangular openings of the netting 15 since the length of the shank 22 often exceeds the vertical extent of the rectangular openings. As such the fencing tool 21 cannot be easily rotated so as to form the turns of the knot 20. In addition, the degree of difficulty in tying the knot 20 increases as the distance above the ground decreases. For the lowermost few horizontal strands 16 the fencer is normally on his hands and knees.

Figure 4:
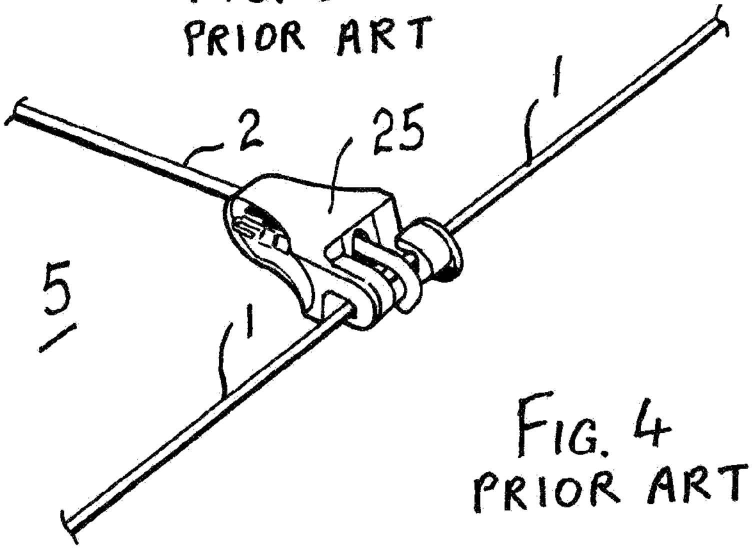
FIG. 4 PRIOR ART
FIG. 4 is a perspective view of a prior art GRIPPLE T-Clip (Trade Mark) used to replace the prior art knot of FIG. 2, the strainer post being omitted in FIG. 4, FIGS. 5A-5E are a sequence of drawings illustrating how the prior art knot of FIG. 2 is formed.

Turning now to FIG. 4, the knot 20 of FIG. 2 can be replaced by a T-clip 25 which is used to join the first wire 1 and the second wire 2 together around the strainer post 5 (not illustrated in FIG. 4).

The method of constructing the knot 20 is described in the sequence of drawings FIG. 5A-5E. As seen in FIG. 5A, the horizontal strand 16 is looped around the strainer post 5 so as to create the first wire 1 and second wire 2. Then the second wire 2 is pushed downwardly as indicated in FIG. 5B and the free end pulled upwardly between the wires and the strainer post 5 as illustrated in FIG. 5C. Thereafter the second wire 2 is looped over itself and back around the first wire 1 as seen in FIG. 5D. Thereafter, the second wire 2 is coiled tightly around the first wire 1 so as to form a secure twist and complete the knot 20. This is often done by forming a crank handle 27 which permits the second wire 2 to be easily wound around the first wire 1. However, whilst such a crank handle 27 is easily formed and wound in respect of a single plain wires such as the top plain wire 11 of FIG. 1, for the small rectangular openings of the netting 15 such a crank handle is not able to be used at all, or is not able to be used effectively.

Figure 6:
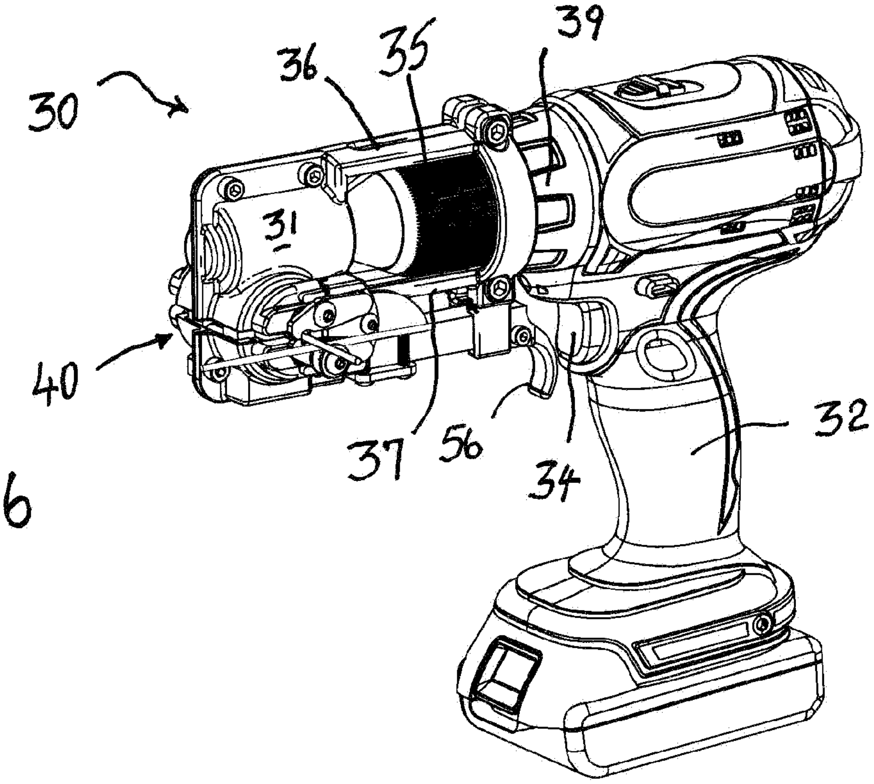
FIG. 6 is a perspective view from above of the fencing attachment and drill of the preferred embodiment.
Figure 7:
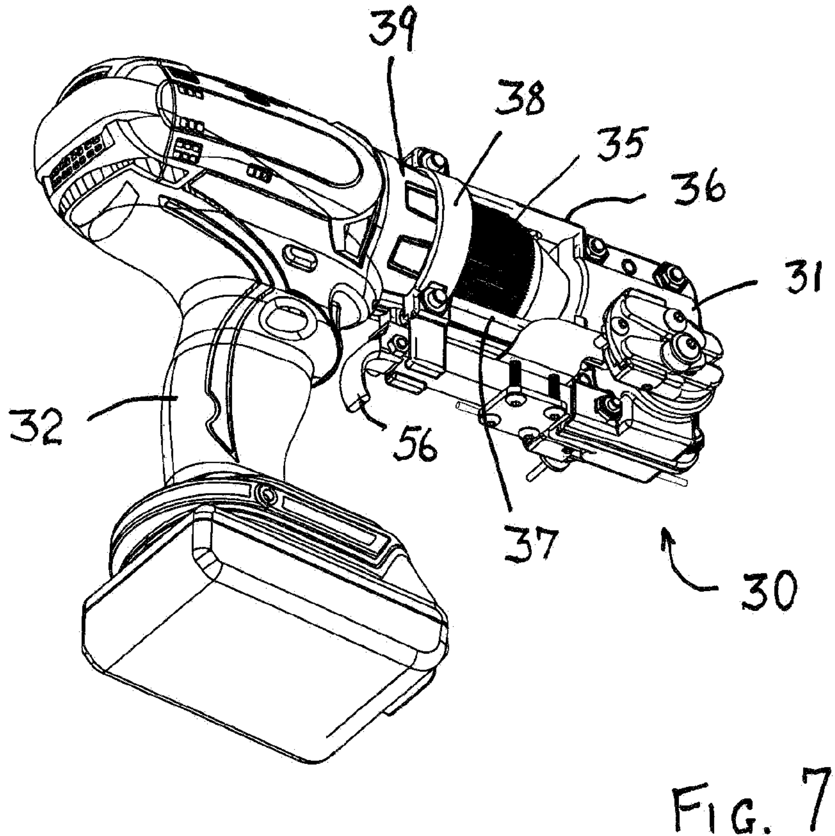
FIG. 7 is a perspective view from below of the fencing attachment and drill of FIG. 6.

Turning now to FIGS. 6 and 7, an embodiment of a portable fencing attachment 30 having a housing 31 and which is able to be secured to a battery-operated portable drill 32, is illustrated. The drill 32 has a drill trigger 34, a chuck 35 and a collet 39. The housing 31 has a pair of arms 36, 37 which support a split clamping ring 38 which can be clamped around and thereby engages the collet 39 and which therefore enables the housing 31 to be releasably secured to the drill 32. The housing 31 has a mouth 40. Protruding from the housing 31 is a driveshaft 41 (FIG. 8) which is able to be engaged with the chuck 35 so as to be rotated by the drill 32.

Figure 8:
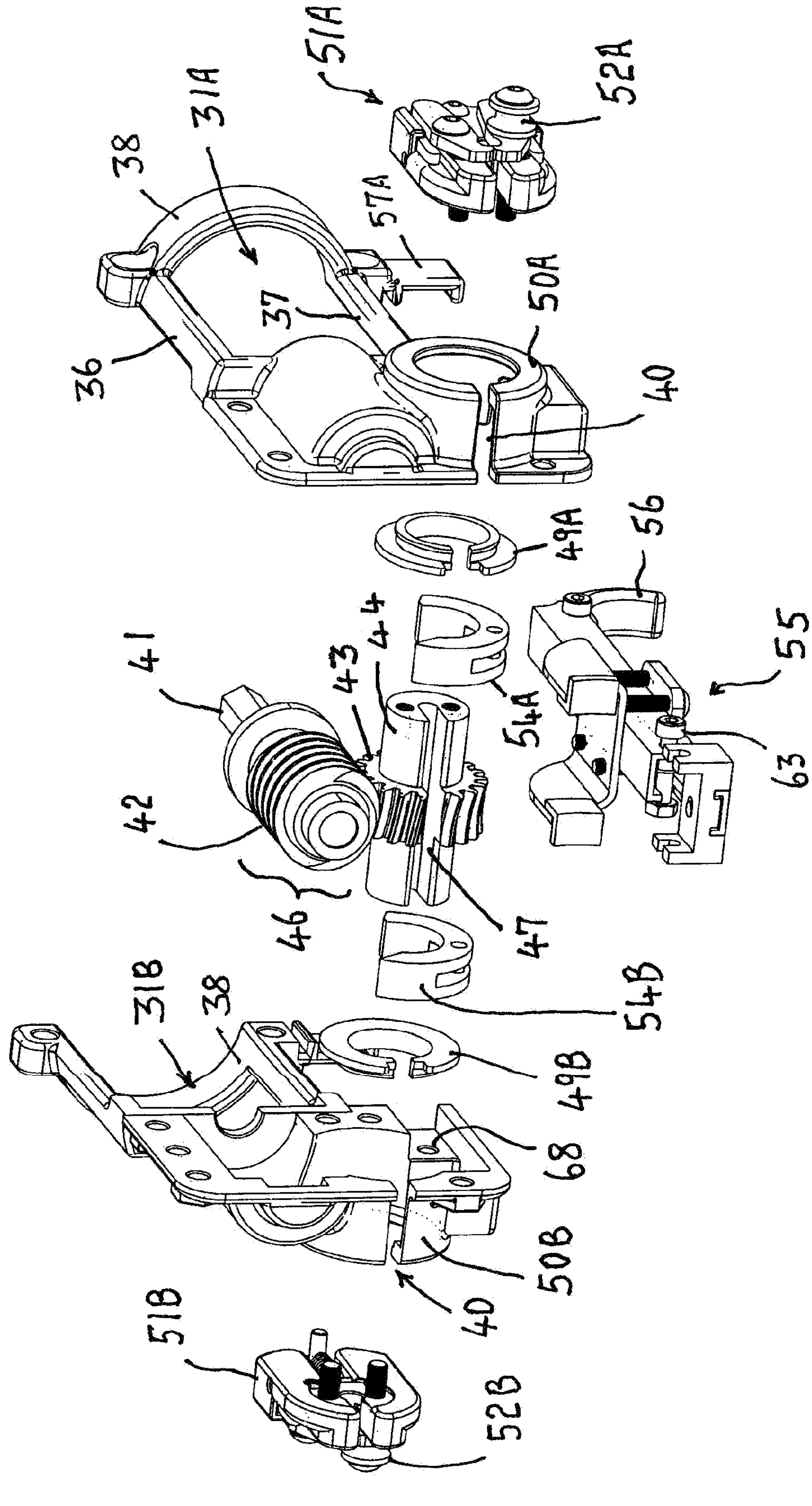
FIG. 8 is an exploded perspective view from the front of the housing of the attachment of FIG. 6.
Figure 9:
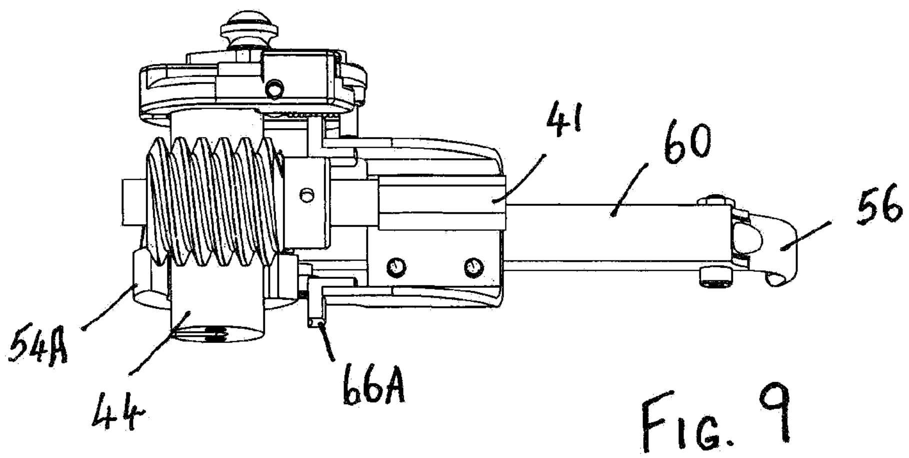
FIG. 9 is a perspective view from above of the drive train and actuator mechanism.

As best seen in FIG. 8, the housing 31 is formed from left and right halves 31A and 31B respectively. The driveshaft 41 is connected to a worm gear 42 which drives a spur gear 43 formed on a rotor 44. The driveshaft 41, worm gear 42 and spur gear 43 form a drive chain 46 which enables the rotor 44 to be rotated. The rotor 44 has a longitudinally extending radial slot 47 and slotted bearings 49 which are rotatably mounted in a corresponding one of two slotted bushes 50A and 50B moulded into the housing 31. Outside each of the bushes 50 is a corresponding one of two winding arms 51A and 51B which are each secured by fasteners to the corresponding end of the rotor 44 and thus rotate with the rotor 44. Each winding arm 51 carries a corresponding one of two sheaves 52A and 52B.

As also seen in FIG. 8, located one to either side of the spur gear 43 is a corresponding one of two arcuate keepers 54A and 54B which are connected to, and operable by, a release actuator 55 having a release trigger 56. As will be explained hereafter the arcuate keepers 54 are able to lock and unlock access to the rotor slot 47.

Turning now to FIGS. 9-12, the release actuator 55 has a tubular body 60 which is mounted for reciprocal sliding motion and has the spring loaded release trigger 56 at one (rear) end and a pair of actuator lugs 61A and 61B at the other (forward) end. The rear end of the tubular body 60 is slidingly supported by a pair of downwardly projecting arms 57A, 57B (as best seen in FIG. 8) and which extend downwardly from the clamping ring 38. The arcuate keepers 54A, 54B are carried by, and pivotally pinned to, the corresponding actuator lugs 61A and 61B. It will be seen in FIG. 10 that in the forward or rest position of the release actuator 55, the arcuate keepers 54 prevent access and egress from the rotor slot 47.

Figure 10:
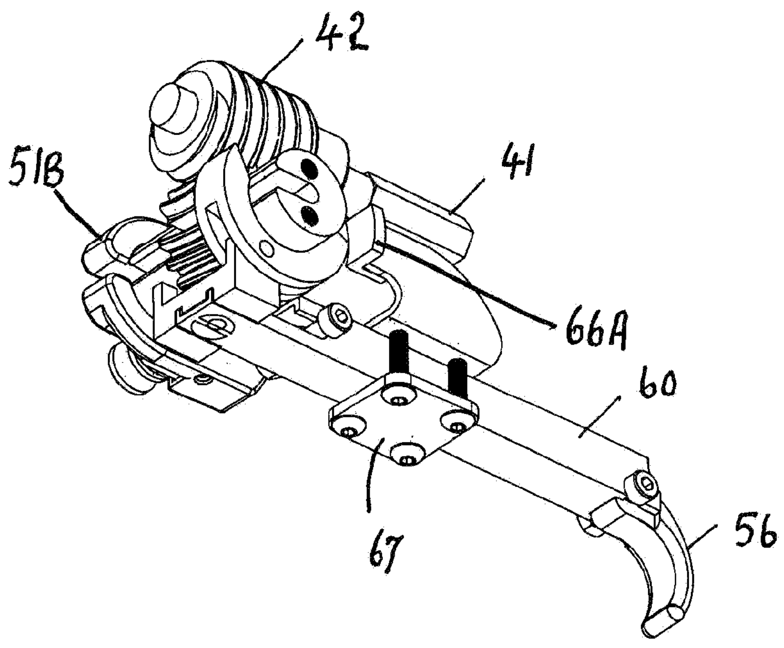
FIG. 10 is a perspective view from below of the drive train and actuator mechanism.

However, when the release trigger 56 is pulled towards the pistol grip of the drill 32, this moves the actuator lugs 61 towards the drill 32, thereby moving the arcuate keepers 54 in an anticlockwise direction as seen in FIG. 10. This therefore permits access and egress from the rotor slot 47.

Figure 11:
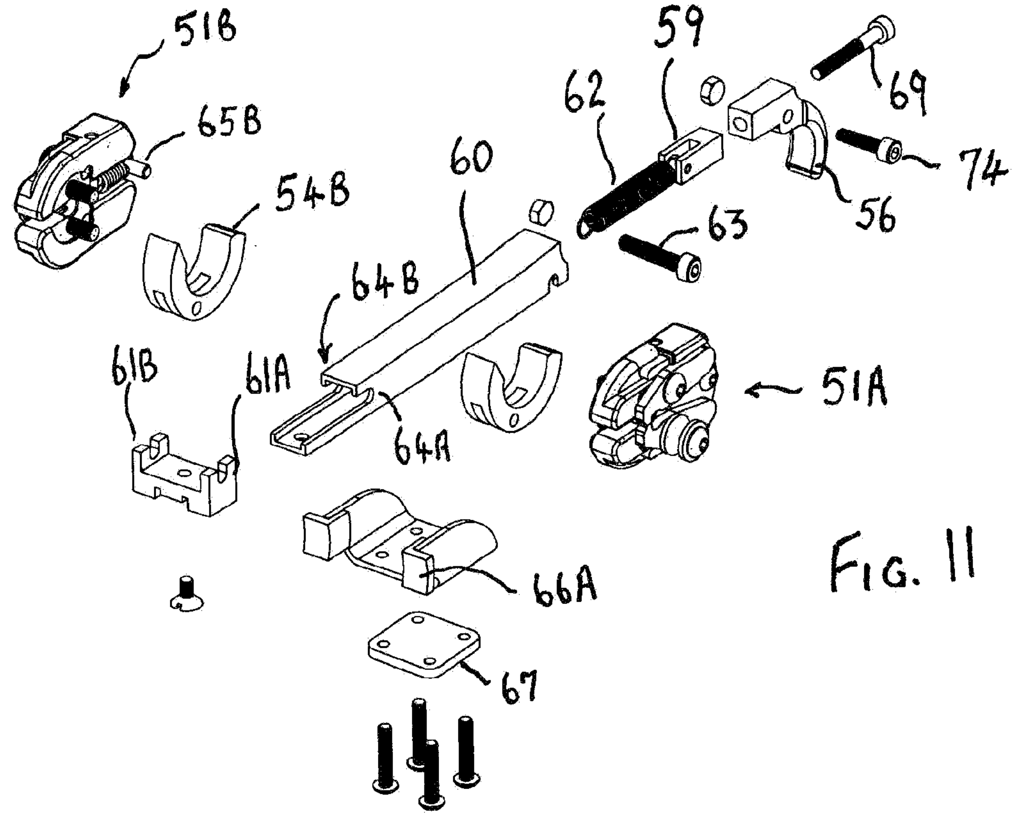
FIG. 11 is an exploded perspective view from above and the front of the actuator mechanism.
Figure 12:
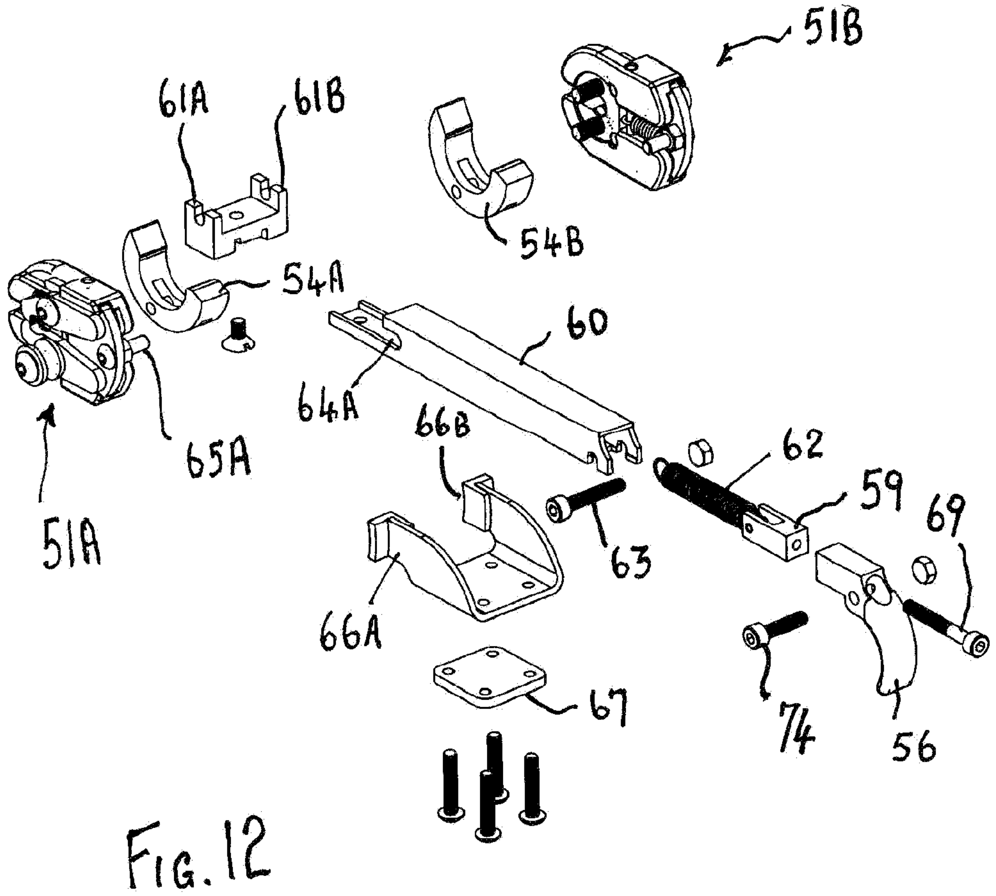
FIG. 12 is an exploded perspective view from above and the rear of the actuator mechanism.

In addition, as best seen in FIGS. 11 and 12, the tubular body 60 has a pair of U-shaped bights 64A and 64B which accommodate a stationary pin 63. The pin 63 extends across, and clamps, the two housing parts 31A and 31B. As best seen in FIG. 8, the pin 63 extends between the holes 68 only one of which is visible in FIG. 8. A release spring 62 (FIGS. 11 and 12) has one end fixed to the stationary pin 63 and the other end fixed to a spring tensioning nut 59 which is shaped to slide within the tubular body 60. During initial assembly, the release spring 62 is connected to the spring tensioning nut 59 which is in turn threadably engaged with the trigger 56 by way of an adjustment screw 69. This sub-assembly is then slid into the tubular body 60. Then the release trigger 56 is attached to the sub-assembly by being inserted into the end of the tubular body 60 and fixed thereto by means of a transverse fastener 74. This allows the spring 62 to be easily installed within the housing 31, and then adjusted to have a pre-load tension placed on the spring 62 to ensure a positive return of the release actuator 55 when the release trigger 56 is let go.

Pulling the release trigger 56 slides the entire tubular body 60 including the actuator lugs 61 rearwardly towards the pistol grip of the drill 32. As a consequence, as explained above, the pinned arcuate keepers 54 are rotated in an anticlockwise direction to release same, and access and egress to the slot 47 is achieved. However, when the release trigger 56 is let go, the tension in the release spring 62 having its forward end fixed to the stationary pin 63, draws the entire tubular body 60 forwardly. This rotates the arcuate keepers 54 in a clockwise direction as seen in FIG. 10 thereby closing off the slot 47.

Extending from the corresponding winding arms 51A and 51B are corresponding rear fasteners 65A, 65B (FIGS. 11-13 and 17-18). Furthermore, a pair of side arms 66A and 66B (FIG. 12) is clamped to the tubular body 60 by means of a holding plate 67. As will be explained hereafter, the rearward motion of the tubular body 60 and its side arm 66A and 66B urges the finger latches of the winding arms to open together with the arcuate keepers 54.

The operation of the finger latches will now be described with reference to FIGS. 14-18 in which since only one winding arm 51 is illustrated, rather than a pair of winding arms, the A and B nomenclature used above will be discontinued. The winding arm 51 incorporates a slidingly mounted, spring loaded, slotted plate 70 which has two kinked slots 71, 72 (FIG. 17). A rear fastener 65 is secured to the rear of the slotted plate 70 and is movable therewith. The slotted plate 70 is mounted in the main body 73 of the winding arm 51. A spring 75 has one end secured to the rear fastener 65 and its other end secured to a stationary post 76 which is fixed to the main body 73. Each rear fastener 65 engages the corresponding side arm 66 and, as a consequence, as the release mechanism 55 moves rearwardly towards the pistol grip of the drill 32, so the slotted plate 70 is also moved rearwardly against the action of the spring 75. The spring 75 urges the slotted plate 70 forwardly into its rest position.

Figure 18:
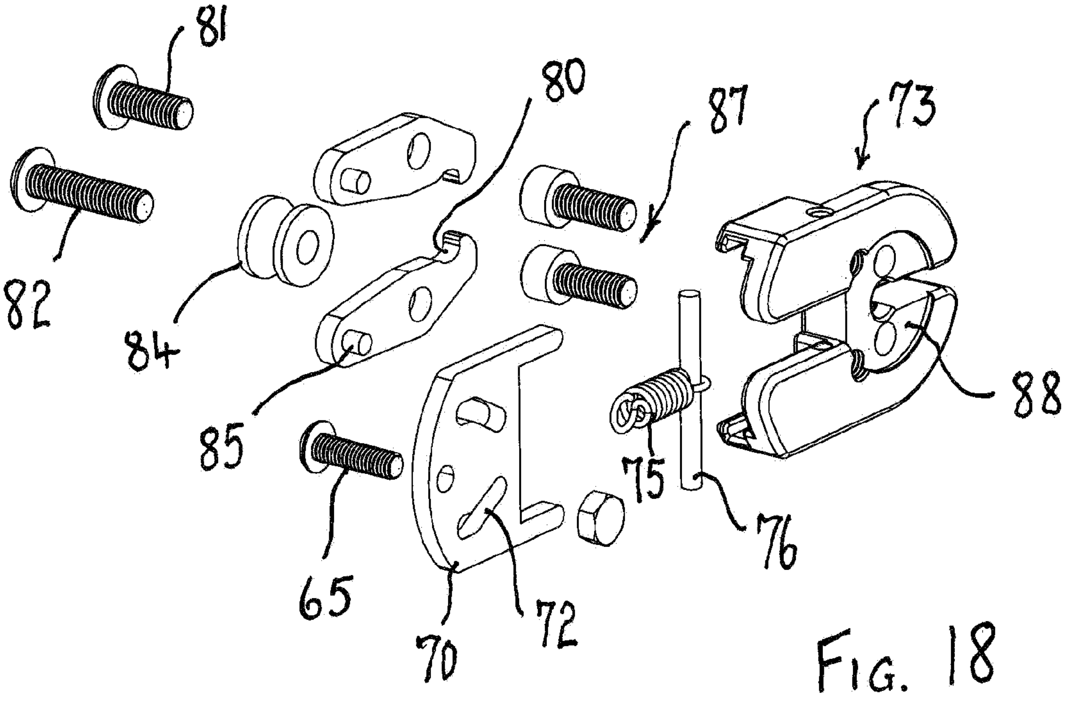
FIG. 18 is an exploded perspective view from the inside of the winding arm.
Figure 19:
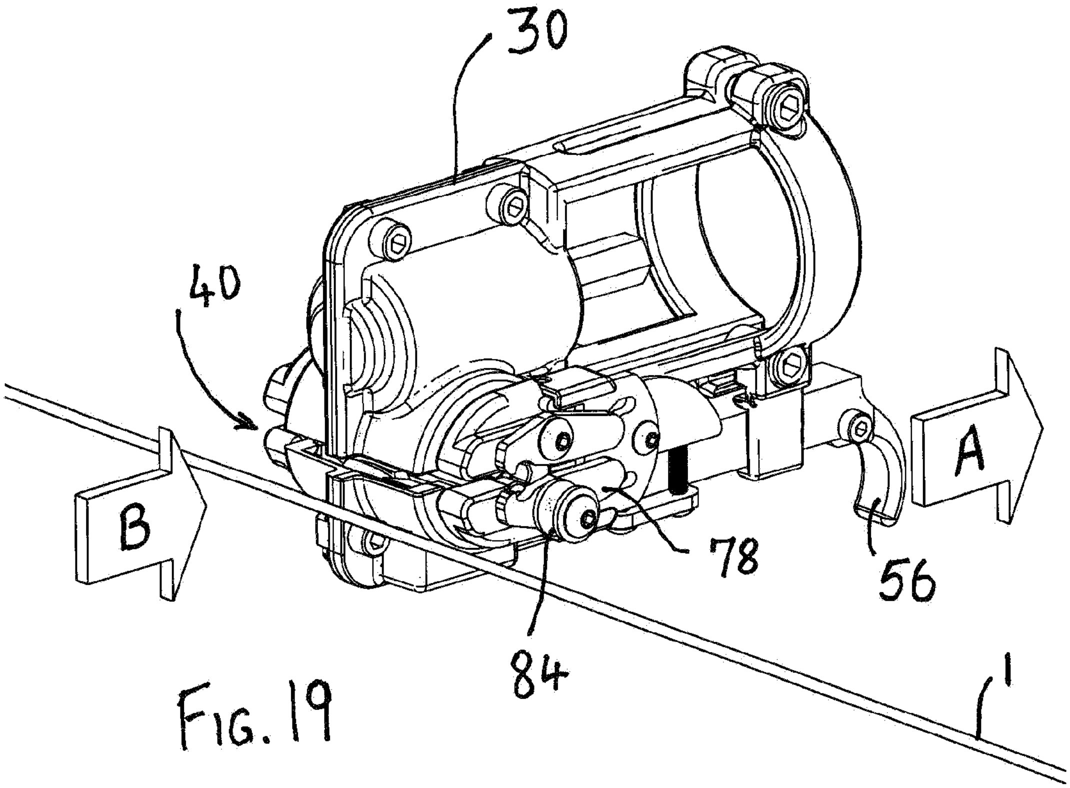
FIG. 19 is an exploded perspective view from the front of the fencing attachment showing the mouth approaching the first wire.
Figure 20:
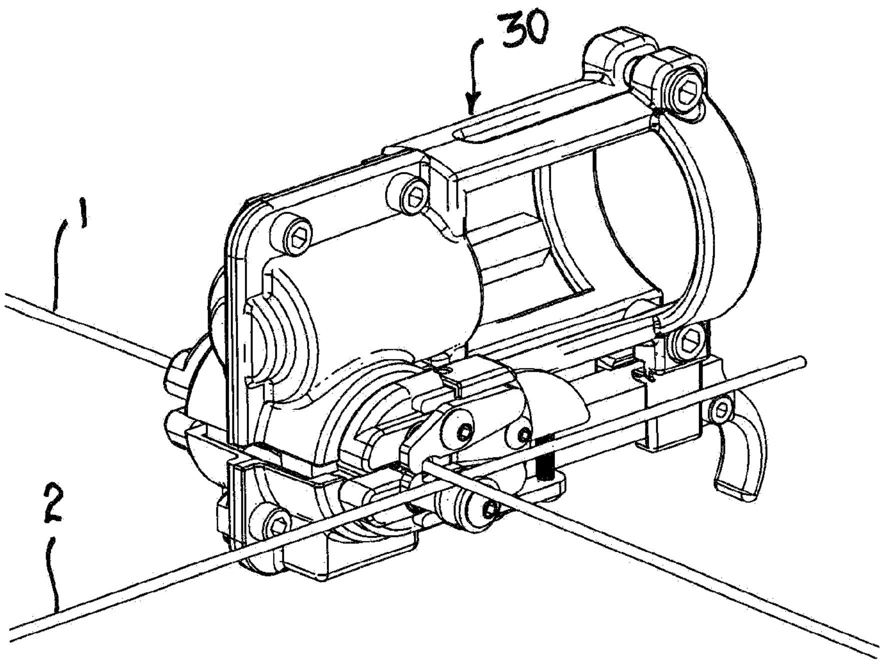
FIG. 20 is a perspective view from the front of the fencing attachment showing the first wire retained in the mouth and the second wire located in the sheave.

A latch mechanism is formed from two fingers 78 each of which has a nose 79. Each finger 78 is pivotally mounted on the main body 73 by means of a short fastener 81 and a longer fastener 82 respectively. The longer fastener 82 includes a sheave 84 rotatably mounted on its shank. As best seen in FIG. 18, each of the fingers 78 has a peg 85 on its interior surface which extends into, and is captured by, the corresponding one of the slots 71, 72.

Figure 13:
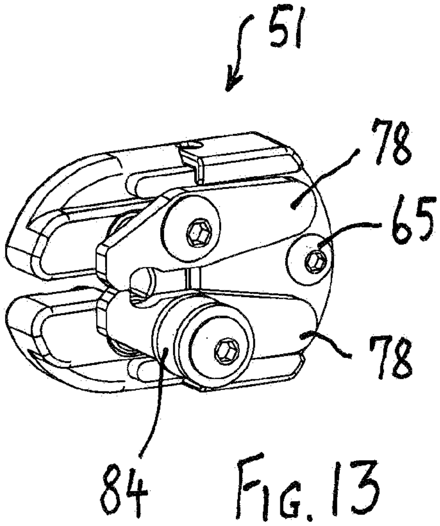
FIG. 13 is a perspective view from the outside of the winding arm and latch fingers, the fingers being closed.
Figure 14:
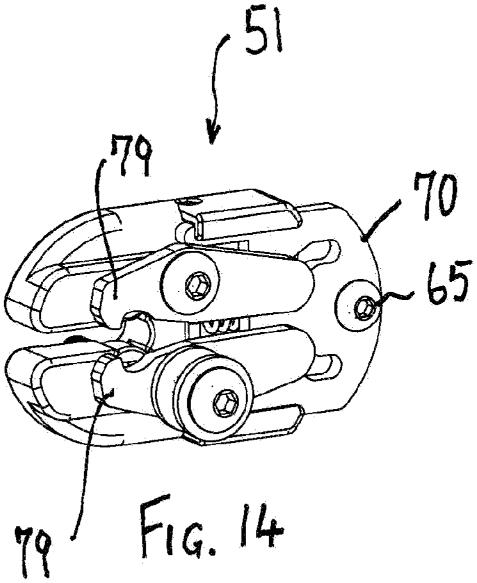
FIG. 14 is a similar view of the winding arm and latch fingers of FIG. 13, but with the fingers being open.
Figure 15:
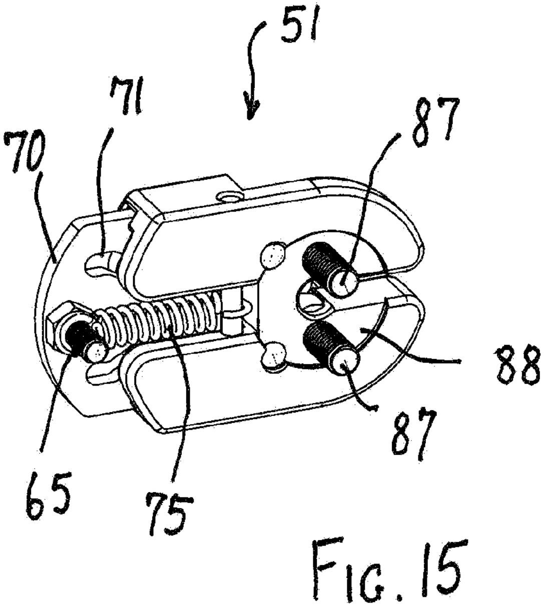
FIG. 15 is a perspective view from the inside of the winding arm and latch fingers, the latch fingers being open.

As a consequence of this arrangement, the fingers 78 constitute a normally closed latch which operates simultaneously with the release mechanism described above. The fingers 78 are pivotable so that when apart (as illustrated in FIG. 14) a wire can be located between a pair of opposed holding recesses 80. Once the finger latch closes, the wire is retained within the opposed holding recesses 80 and the fingers 78 are in their rest position with the noses 79 touching (as illustrated in FIG. 13).

In the event that the release actuator 55 is operated, the rearward motion of the tubular body 60 is transmitted via the rear fasteners 65 and side arms 66 so as to move the slotted plate 70 rearwardly and thereby move the noses 79 apart. This action is required at the end of the wire winding action as will be explained hereafter.

Figure 16:
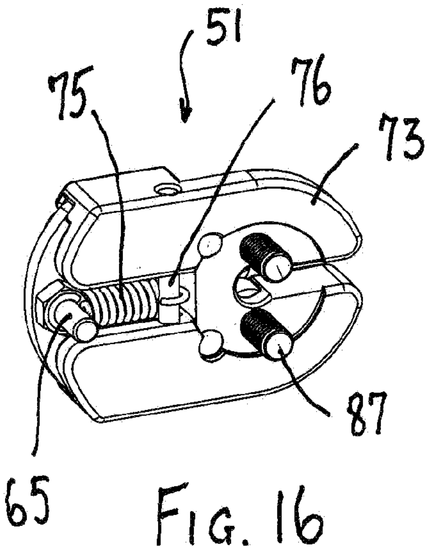
FIG. 16 is a perspective view from the inside of the winding arm and latch fingers, the latch fingers being closed.
Figure 17:
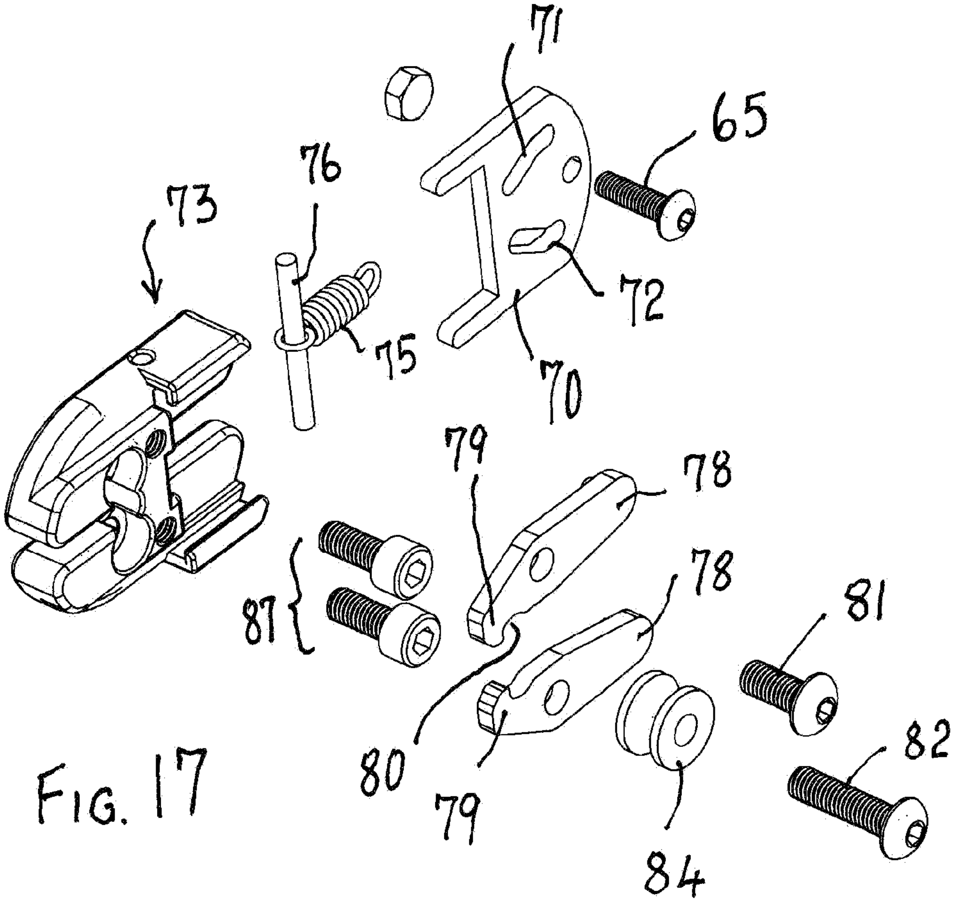
FIG. 17 is an exploded perspective view from the outside of the winding arm.

As also seen in FIGS. 16-18, a pair of fasteners 87 pass through a slotted disc 88 and into a corresponding pair of threaded apertures located in the ends of the rotor 44 (as best seen in FIG. 8). This ensures that the slotted disc 88 and the entire winding arm 51 rotates with the rotor 44. It will be apparent from FIG. 14 that the sheave 84 is slightly offset from the centre of the slotted disc 88. Preferably, this offset is arranged so that the surface of the sheave 52 closest to the slot 47 and holding recesses 80 is spaced therefrom a distance of approximately one wire diameter.

Turning now to FIGS. 19-24, in which the drill 32 is omitted so as to not overburden the drawings, the winding action will now be described. The first wire 1 is shown in a horizontal position. It is normally necessary to operate the drill 32 momentarily, so as to rotate the winding arms 51 to align them with the mouth 40. Thereafter the release trigger 56 is moved rearwardly as indicated by arrow A in FIG. 19. This opens the arcuate keepers 54 and the fingers 57 and thereby permits the wire 1 to enter into the mouth 40 of the attachment 30. This is indicated by arrow B in FIG. 19. Since the first wire 1 is normally stationary, this relative motion between the first wire 1 and the attachment 30 is normally accomplished by moving the attachment 30.

Once the wire 1 is safely within the mouth 40, the release trigger 56 is let go thereby moving the arcuate keepers 54 so as to close off the slot 47 in the rotor 44. In addition, the fingers 78 of the finger latch are also closed, thereby also retaining the first wire 1 in the position illustrated in FIG. 20. In this position, the second wire 2 is pushed over the sheave 84 and under the first wire 1.

Figure 21:
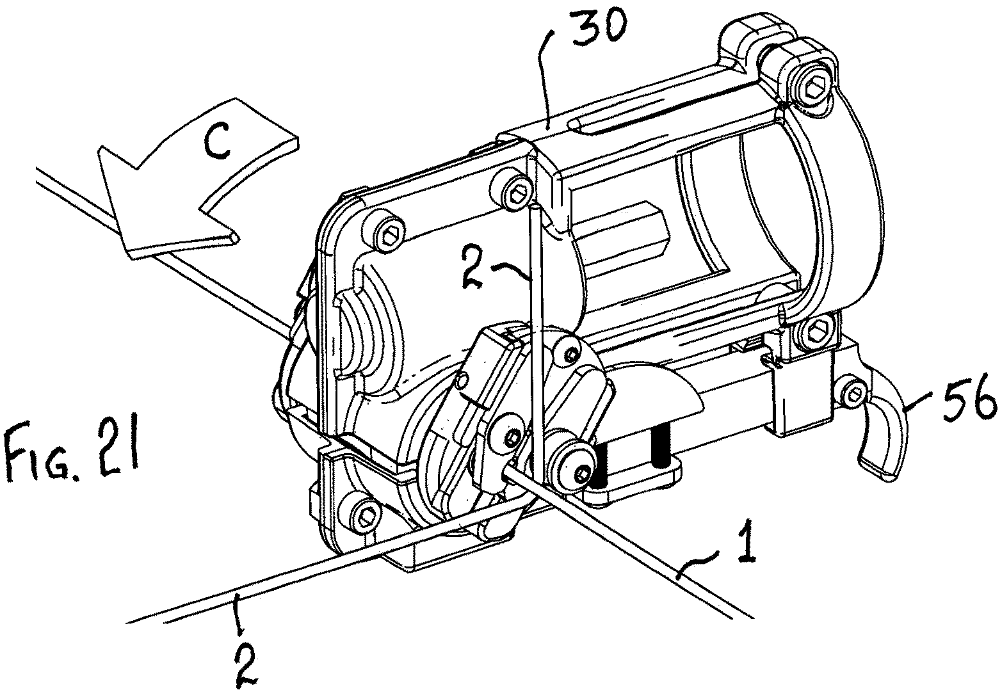
FIG. 21 is a perspective view from the front showing the initial movement of the winding arm.
Figure 22:
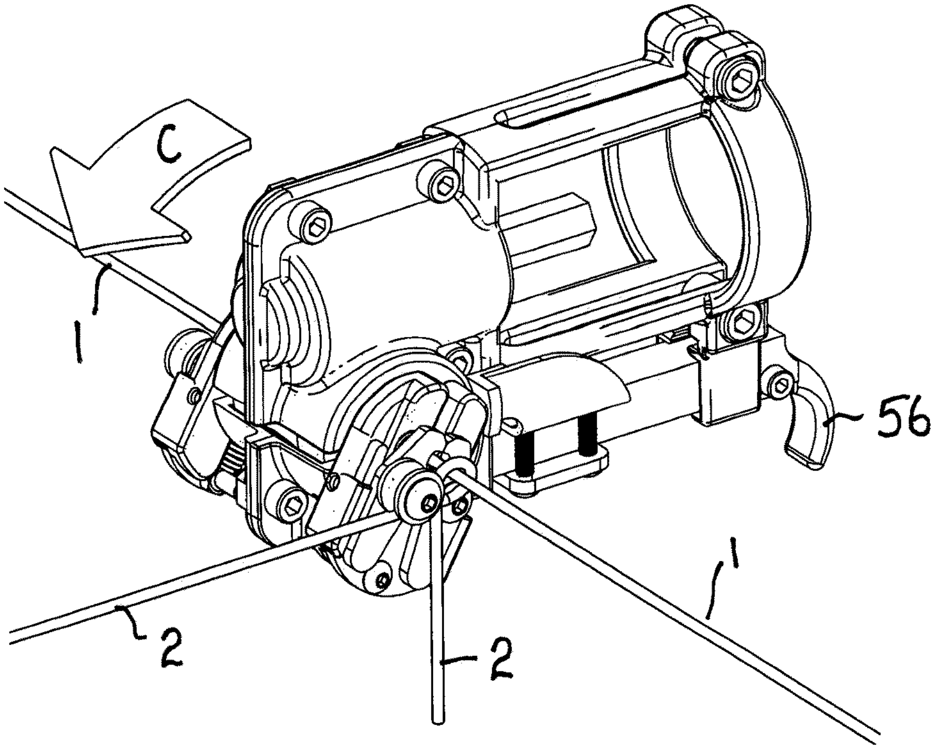
FIG. 22 is a perspective view from the front showing the winding arm completing a 270° turn.

Thereafter the winding arms 51 are rotated in the direction of arrow C through approximately 270° as illustrated in FIGS. 21 and 22. At this stage the rotation is stopped, the attachment 30 is slid along the first wire 1 away from the second wire 2. The downwardly pointing free end of the second wire 2 is then manually bent by the operator through 180° so as to wind the free end of the second wire 2 around the second wire 2 and into the position illustrated in FIG. 23. Then the attachment 30 is moved along the first wire 1 back towards the second wire 2. The upwardly pointing free end of the second wire 2 is then manually engaged with the sheave 84.

Figure 23:
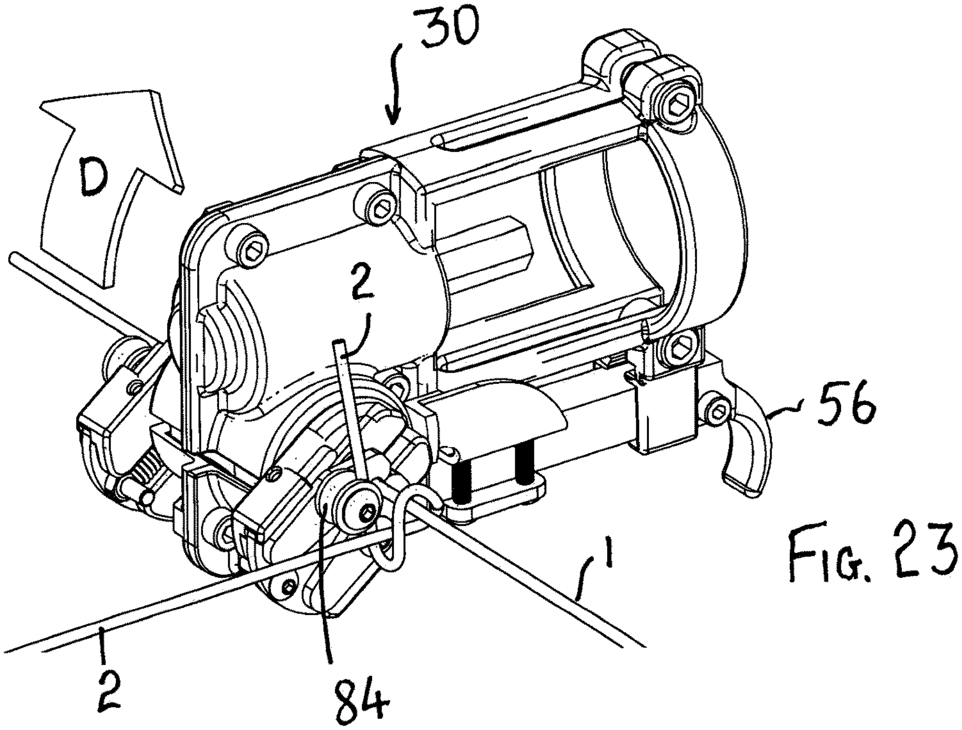
FIG. 23 is a perspective view from the front after the free end of the second wire has been manually bent through 180° and located in the sheave.
Figure 24:
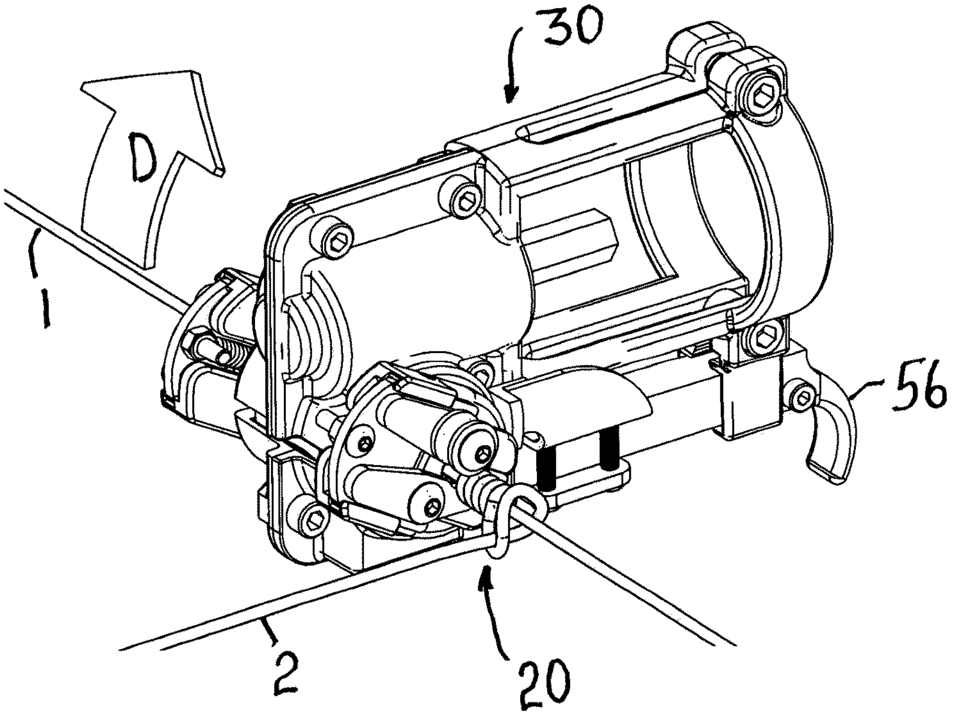
FIG. 24 is a perspective view from the front showing the winding of a plurality of 360° turns of the second wire around the first wire.

Next the operator manipulates the drill 32 so as to change its direction of rotation and rotates the drill in the direction of arrow D as illustrated in FIG. 23. As a consequence, the rotary motion of the sheave 84 turns the free end of the second wire 2 in the opposite direction from that used to create the single turn of FIGS. 19-22. This action thereby creates a multiplicity of tight turns of the second wire 2 around the first wire 1. This completes the desired knot 20 and so the rotation of the drill is stopped. Normally the drill 32 must then be rotated through a fraction of a revolution so as to align the winding arms 51 with the mouth 40. Thereafter the release trigger 56 can be moved rearwardly so as to open both the fingers 78 and the arcuate keepers 54. This permits the attachment 30 to be moved away from the first wire 1. As the mouth 40 leaves the first wire 1 adjacent the recently tied knot 20, this completes the knot tying operation.

The foregoing describes only one embodiment of the present invention and modifications, obvious to those skilled in the fencing arts, can be made thereto without departing from the scope of the present invention. For example, although two winding arms 51A and 51B are illustrated, it is possible to manufacture the attachment with only a single winding arm 51. Having two winding arms permits the attachment 30 to be operated by the same hand of the operator at each end of a roll of netting, whilst the operator is located on the same side of the netting. This is particularly important for exclusion fencing where it is difficult to climb over the netting.

The term "comprising" (and its grammatical variations) as used herein is used in the inclusive sense of "including" or "having" and not in the exclusive sense of "consisting only of".

The invention claimed is:

1. A fencing attachment for a hand held power tool having a power outlet, said attachment comprising:
- a housing having a mouth,
- an engagement means associated with said housing to permit both the housing to be engaged with the power tool and a drive input of the attachment to be rotatably coupled to the power outlet,
- a gear train extending from said drive input to a rotor having an axis of rotation,
- said rotor having a longitudinally extending radial slot which reaches said rotor axis of rotation,
- and said rotor being rotatably mounted facing said mouth,
- at least one winding arm mounted exterior of said housing, being rotatable with said rotor, and carrying a sheave rotatably mounted on said winding arm at a location radially spaced from said axis of rotation,
- wherein said mouth can envelop a first stationary wire and locate same within said rotor substantially co-incident with said axis of rotation,
- a second wire can be engaged with said sheave, and
- rotation of said rotor by said power tool winds said second wire around said first wire.

2. The attachment as claimed in claim 1 having a pair of said winding arms located on opposite sides of said mouth and each being rotatable with said rotor.

3. The attachment as claimed in claim 1 having at least one arcuate keeper movable between an open position in which said first wire can enter said mouth and said slot, and a closed position in which said first wire is prevented from leaving said mouth and said slot.

4. The attachment as claimed in claim 3 wherein the or each of said at least one arcuate keeper is/are movable by a release actuator located within said housing and having a release trigger which extends beyond said housing.

5. The attachment as claimed in claim 4 wherein each said winding arm has a pair of opposed pivoted fingers constituting a latching support rest for said first wire and located closely adjacent said sheave.

6. The attachment as claimed in claim 5 wherein each of said fingers has a tip, said fingers are resiliently mounted, are biased towards a closed configuration in which the tips of said fingers contact each other to form a latch, and are movable by said release actuator to release said latch and permit said first wire to move out of said mouth.

7. A method of winding a second wire around a first wire to form part of a fencing knot, said method comprising the steps of:
- passing said first wire into the mouth of the attachment as defined in claim 1 and locating said first wire in said longitudinally extending radial slot,
- positioning said second wire on said sheave and crossing said first wire,
- operating said power tool to rotate said rotor and winding arm to thereby roll said sheave and second wire around said first wire.

8. The method as claimed in claim 7 wherein said first and second wires are part of the same wire.

9. The attachment as claimed in claim 2 having at least one arcuate keeper movable between an open position in which said first wire can enter said mouth and said slot, and a closed position in which said first wire is prevented from leaving said mouth and said slot.

10. The attachment as claimed in claim 9 wherein the or each of said at least one arcuate keeper is/are movable by a release actuator located within said housing and having a release trigger which extends beyond said housing.

11. The attachment as claimed in claim 10 wherein each said winding arm has a pair of opposed pivoted fingers constituting a latching support rest for said first wire and located closely adjacent said sheave.

12. The attachment as claimed in claim 11 wherein each of said fingers has a tip, said fingers are resiliently mounted, are biased towards a closed configuration in which the tips of said fingers contact each other to form a latch, and are movable by said release actuator to release said latch and permit said first wire to move out of said mouth.

* * * * *